(12) United States Patent
Kowalewski et al.

(10) Patent No.: US 7,999,503 B2
(45) Date of Patent: Aug. 16, 2011

(54) CONTROL MODULE FOR DYNAMIC OPERATION OF A POWER INVERTER USING AN APPLICATION SPECIFIC INTEGRATED CIRCUIT

(75) Inventors: Daniel L. Kowalewski, Redondo Beach, CA (US); Ted D. Peterson, Playa Del Rey, CA (US); David Tang, Fontana, CA (US); Mark L. Selogie, Manhattan Beach, CA (US); Michael R. Grimes, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 378 days.

(21) Appl. No.: 12/237,183

(22) Filed: Sep. 24, 2008

(65) Prior Publication Data

US 2010/0072942 A1 Mar. 25, 2010

(51) Int. Cl.
*H02P 27/04* (2006.01)
(52) U.S. Cl. ........ 318/809; 318/807; 318/767; 318/811; 318/798
(58) Field of Classification Search .................. 318/809, 318/807, 767, 811, 798
See application file for complete search history.

(56) References Cited

U.S. PATENT DOCUMENTS

| | | | |
|---|---|---|---|
| 5,990,657 A * | 11/1999 | Masaki et al. | 318/811 |
| 7,053,587 B2 * | 5/2006 | Ito et al. | 318/801 |
| 7,279,862 B1 | 10/2007 | Welchko et al. | |
| 7,307,401 B2 | 12/2007 | Gataric et al. | |
| 7,391,181 B2 | 6/2008 | Welchko et al. | |
| 7,589,986 B2 * | 9/2009 | Bocchiola | 363/98 |
| 2008/0116840 A1 | 5/2008 | Welchko et al. | |
| 2008/0197902 A1 | 8/2008 | Welchko et al. | |

OTHER PUBLICATIONS

Welchko, B. A., Schulz, S. E., and Hiti, S., U.S. Appl. No. 11/736,687, entitled "Method and system for pulse position scheduling in electric drives," and filed on Apr. 18, 2007.

Hiti, S., Schulz, S. E., and Welchko, B. A., U.S. Appl. No. 11/756,421, entitled "Apparatus, systems, and methods for reducing voltage source inverter losses," and filed on May 31, 2007.

Welchko, B. A., Schulz, S. E., and Hiti, S., U.S. Appl. No. 11/853,884, entitled "Method and system for controlling power inverters in electric drives of vehicles with two-mode transmissions," and filed on Sep. 12, 2007.

Schulz, S. E., West, S. T., Welchko, B. A., and Hiti, S., U.S. Appl. No. 11/923,270, entitled "Method and system for controlling a power inverter in electric drives," and filed on Oct. 24, 2007.

(Continued)

*Primary Examiner* — Walter Benson
*Assistant Examiner* — David S Luo
(74) *Attorney, Agent, or Firm* — Ingrassia Fisher & Lorenz, P.C.

(57) ABSTRACT

Systems and apparatus are provided for a control module for operating an inverter in a vehicle. A control module comprises a first circuit card assembly and a microprocessor mounted on the first circuit card assembly. The microprocessor is configured to determine a phase modulation command for a first motor phase and determine a modulation criterion for the inverter. An integrated circuit is communicatively coupled to the microprocessor. The integrated circuit is configured to generate a first modulation signal based on the phase modulation command and the modulation criterion and generate a second modulation signal based on the phase modulation command and the modulation criterion.

20 Claims, 4 Drawing Sheets

OTHER PUBLICATIONS

Schulz, S. E., West, S. T., Welchko, B. A., and Hiti, S., U.S. Appl. No. 11/923,287, entitled "Method and system for controlling a power inverter in electric drives of vehicles with two-mode transmissions," and filed on Oct. 24, 2007.

Schulz, S. E., Welchko, B. A., and Hiti, S., U.S. Appl. No. 11/923,293, entitled "Method and system for controlling pulse width modulation in a power inverter in electric drives," and filed on Oct. 24, 2007.

Welchko, B. A., Schulz, S. E., and Hiti, S., U.S. Appl. No. 12/013,093, entitled "Method and system for controlling a power inverter in electric drives," and filed on Jan. 11, 2008.

Tang, D., Welchko, B. A., Hiti, S., and Selogie, M., U.S. Appl. No. 11/758,974, entitled "Protection for motor control circuits," and filed on Jun. 6, 2007.

* cited by examiner

CONTROL MODULE FOR DYNAMIC OPERATION OF A POWER INVERTER USING AN APPLICATION SPECIFIC INTEGRATED CIRCUIT

TECHNICAL FIELD

Embodiments of the subject matter described herein relate generally to vehicle drive systems, and more particularly, embodiments of the subject matter relate to electric and/or hybrid vehicles having an inverter drive system.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric motors used in such vehicles, receive electrical power from alternating current (AC) power supplies. However, the power sources (e.g., batteries) used in such applications provide direct current (DC) power. Thus, devices known as "power inverters" are used to convert the DC power to AC power. Such power inverters often utilize several switches, or transistors, operated at various intervals to convert the DC power to AC power.

Typically, the switches of the inverter are operated by using pulse-width modulation (PWM) techniques to control the amount of current and/or voltage provided to the electric motor. Often, a microprocessor generates PWM signals for the switches in the inverter, and provides the PWM signals to a gate driver, which turns the switches on and off. The microprocessor and gate driver often reside on separate circuit card assemblies, and interface via one or more buffers, amplifiers, and other discrete components.

During operation, it is often possible to improve the efficiency of the electric motor and/or the inverter by varying the switching frequency of the PWM signals or the manner in which they are generated. However, the additional tasks and computations required to dynamically adjust the PWM signals using software can increase processing overhead and thereby reduce the throughput of the microprocessor and add latency to the system. Current systems are challenged to provide dynamic real-time operation of the electric motor, and are thus, limited in terms of efficiency.

BRIEF SUMMARY

An apparatus is provided for a control module for an inverter in a vehicle. The control module comprises a first circuit card assembly and a microprocessor mounted on the first circuit card assembly. The microprocessor is configured to determine a phase modulation command for a first motor phase and determine a modulation criterion for the inverter. An integrated circuit is communicatively coupled to the microprocessor. The integrated circuit is configured to generate a first modulation signal based on the phase modulation command and the modulation criterion, and generate a second modulation signal based on the phase modulation command and the modulation criterion.

In another embodiment, an automotive drive system is provided. The automotive drive system comprises an energy source and an electric motor having a phase. An inverter is coupled between the energy source and the electric motor. The inverter has a phase leg corresponding to the phase of the electric motor, wherein the phase leg comprises a first switch and a second switch. A control module is coupled to the inverter and configured to modulate the phase leg of the inverter to achieve a desired power flow between the energy source and the electric motor. The control module comprises a microprocessor configured to determine a phase modulation command for the phase of the electric motor, and determine a modulation criterion for the inverter. The control module further comprises an integrated circuit communicatively coupled to the microprocessor. The integrated circuit is configured to generate a first modulation signal for the first switch based on the phase modulation command and the modulation criterion, and generate a second modulation signal for the second switch based on the phase modulation command and the modulation criterion. The control module also comprises a gate driver communicatively coupled to the integrated circuit and the phase leg of the inverter. The gate driver modulates the first switch based on the first modulation signal, and modulates the second switch based on the second modulation signal.

In yet another embodiment, an apparatus is provided for a control module for an inverter having a phase leg. The control module comprises a microprocessor configured to determine a length of a switching cycle, determine a percentage duty cycle for the phase leg, and determine a modulation criterion for the inverter. An application specific integrated circuit is communicatively coupled to the microprocessor. The application specific integrated circuit is configured to generate a first modulation signal for a first switch of the phase leg based on the length of the switching cycle, the percentage duty cycle, and the modulation criterion. The application specific integrated circuit also generates a second modulation signal for a second switch of the phase leg based on the length of the switching cycle, the percentage duty cycle, and the modulation criterion. The application specific integrated circuit generates the modulation signals such that the first modulation signal and the second modulation signal are adjusted for dead time.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematics shown herein depict exemplary arrangements of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Similarly, the terms "first", "second" and other such numerical terms referring to structures do not imply a sequence or order unless clearly indicated by the context. Such terminology may include the words specifically mentioned above, derivatives thereof, and words of similar import.

For the sake of brevity, conventional techniques related to signaling, current sensing, electric motor control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to systems for operating a power inverter configured to drive an electric motor. A control module is configured to operate the power inverter using a microprocessor communicatively coupled to an integrated circuit, preferably an application specific integrated circuit (ASIC). The control module operates the power inverter more efficiently by providing dynamic pulse-width modulation (PWM) control of the power inverter by adjusting the switching frequency and/or other modulation criteria in response to real-time operation of the electric motor.

Figure 1:
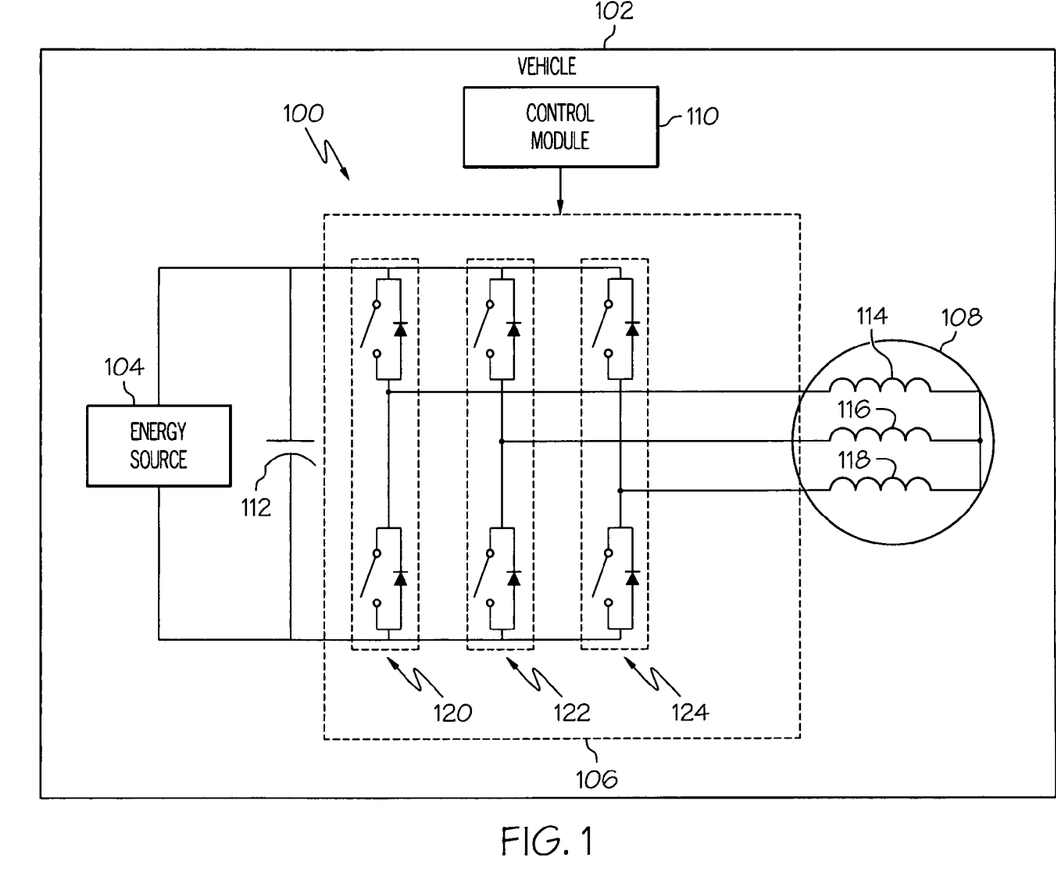
FIG. 1 is a block diagram of an exemplary electrical system suitable for use in a vehicle in accordance with one embodiment.

FIG. 1 depicts an exemplary embodiment of an electrical system 100 suitable for use as an automotive drive system for a vehicle 102. In an exemplary embodiment, the electrical system 100 includes, without limitation, an energy source 104, a power inverter module 106, a motor 108, and a control module 110. A capacitor 112 may be coupled between the energy source 104 and the inverter module 106 such that the capacitor 112 and energy source 104 are electrically parallel. In this regard, the capacitor 112 may alternatively be referred to as the DC link capacitor or bulk capacitor. In an exemplary embodiment, the control module 110 operates the inverter module 106 to achieve a desired power flow between the energy source 104, as described in greater detail below.

The vehicle 102 is preferably realized as an automobile, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 102 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor. In this regard, the energy source 104 may comprise a battery, a fuel cell (or fuel cell stack), an ultracapacitor, a controlled generator output, or another suitable voltage source. The battery may be any type of battery suitable for use in a desired application, such as a lead acid battery, a lithium-ion battery, a nickel-metal battery, or another rechargeable battery.

In an exemplary embodiment, the motor 108 is realized as an electric motor. As shown in FIG. 1, in an exemplary embodiment, the motor 108 is realized as a multi-phase alternating current (AC) motor and includes a set of windings (or coils), wherein each winding corresponds to a phase of the motor 108, as described in greater detail below. Although not illustrated, the motor 108 includes a stator assembly (including the coils), a rotor assembly (including a ferromagnetic core), and a cooling fluid (i.e., coolant), as will be appreciated by one skilled in the art. The motor 108 may be an induction motor, a permanent magnet motor, or any type suitable for the desired application. Although not illustrated, the motor 108 may also include a transmission integrated therein such that the motor 108 and the transmission are mechanically coupled to at least some of the wheels of the vehicle 102 through one or more drive shafts.

In the exemplary embodiment shown in FIG. 1, the motor 108 is realized as a three-phase AC motor having a three-phase set of windings including a first (e.g., phase A) winding 114, a second (e.g., phase B) winding 116, and a third (e.g., phase C winding 118. It should be understood that the labeling of phases A, B, and C is for ease of description and is not intended to limit the subject matter in any way. Furthermore, it should be understood that although the electrical system 100 is described herein in the context of a three-phase motor, the subject matter described herein is independent of the number of phases of the motor.

In the exemplary embodiment shown in FIG. 1, the power inverter module 106 includes six switches (e.g., semiconductor devices, such as transistors and/or switches) with antiparallel diodes (i.e., diodes which are antiparallel to each switch). Preferably, the switches are realized using insulated-gate bipolar transistors (IGBTs). As shown, the switches in the inverter module 106 are arranged into three phase legs (or pairs), with phase legs 120, 122, 124 each being coupled to a respective end of the windings 114, 116, 118. In this regard, phase leg 120 is coupled to the phase A winding 114, phase leg 122 is coupled to the phase B winding 116, and phase leg 124 is coupled to the phase C winding 118. Thus, phase leg 120 may be referred to as the phase A leg, phase leg 122 the phase B leg, and phase leg 124 the phase C leg.

In an exemplary embodiment, the control module 110 is in operable communication and/or electrically coupled to the inverter module 106. The control module 110 is responsive to commands received from the driver of the vehicle 102 (e.g., via an accelerator pedal) and provides a command to the inverter module 106 to control the output of the inverter phase legs 120, 122, 124. In an exemplary embodiment, the control module 110 is configured to modulate and control the inverter module 106 using high frequency pulse width modulation (PWM), as described below. The control module 110 provides PWM signals to operate the switches within the inverter phase legs 120, 122, 124 to cause output voltages to be applied across the windings 114, 116, 118 within the motor 108 in order to operate the motor 108 with a commanded torque. Although not illustrated, the control module 110 may generate current and/or voltage commands for the phases of the motor 108 in response to receiving a torque command from an electronic control unit (ECU), system controller, or another control module within the vehicle 102. Further, in some embodiments, the control module 110 may be integral with an ECU or another vehicle control module.

Figure 2:
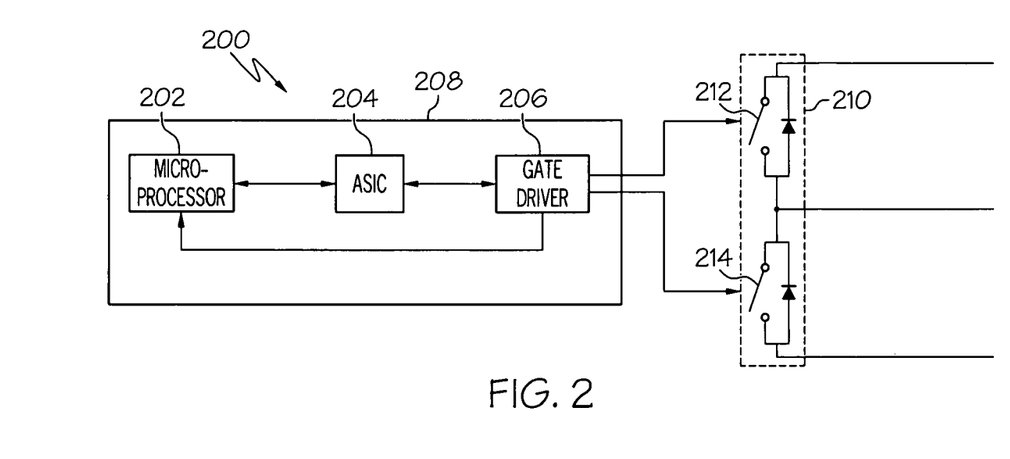
FIG. 2 is a block diagram of a control module suitable for use with the electrical system of FIG. 1 in accordance with one embodiment.

FIG. 2 illustrates a control module 200 suitable for use in the electrical system 100 of FIG. 1 in accordance with one embodiment. The control module 200 includes, without limitation, a microprocessor 202 and an integrated circuit 204. Depending on the embodiment, the control module 200 may also include a gate driver 206. In the embodiment shown in FIG. 2, the microprocessor 202, the integrated circuit 204, and the gate driver 206 are communicatively coupled and each mounted on one physical circuit card assembly 208. The output of the gate driver 206 is coupled to a phase leg 210 of an inverter (e.g., leg 120, 122 or 124 of inverter 106), and configured to operate switches 212, 214 as described in greater detail below. It should be understood that FIG. 2 is a simplified representation of a control module and is not intended to limit the subject matter in any way. Furthermore, although FIG. 2 depicts a control module 200 configured to operate a single phase leg 210 for ease of description, in practice, the control module 200 can operate any number of phase legs, as will be appreciated in the art.

In an exemplary embodiment, the microprocessor 202 is realized as a general purpose processing unit capable of executing control software for enabling and/or performing the functions described below. As depicted in FIG. 2, the microprocessor 202 is implemented as an integrated circuit chip or package that is physically distinct from the gate driver 206 and integrated circuit 204. In an exemplary embodiment, the microprocessor 202 determines a phase modulation command for a motor phase that corresponds to the inverter phase leg 210. The microprocessor 202 determines a phase modulation command for the individual phase of the motor 108 based on a torque command, the voltage of energy source 104, the angular velocity (e.g., revolutions per minute or RPMs) of the motor 108, and possibly other operating parameters of the electric system 100.

In accordance with one embodiment, the microprocessor 202 is configured to determine the phase modulation command by determining a switching frequency and a percentage duty cycle for the motor phase. For example, at lower RPMs, a lower switching frequency improves overall system efficiency by reducing switching losses in the inverter. The microprocessor 202 may determine the efficient switching frequency, and from that determine a length of switching cycle (e.g., the switching period or inverse of the switching frequency). Based on the length of the switching cycle, the torque command and possibly other operating parameters, the microprocessor 202 determines percentage duty for the phase leg 210 cycle by determining a duration of time that the upper switch 212 in the phase leg 210 should be on (the "high time" for the phase leg 210) during the switching cycle. The microprocessor 202 may then provide the duration of the switching cycle along with the high time for the phase leg 210 to the integrated circuit 204 over a parallel bus or another means for digital communication.

In an exemplary embodiment, the microprocessor 202 is also configured to determine or identify one or more modulation criteria for the inverter (e.g., inverter 106). The modulation criterion may include a modulation mode and/or a modulation scheme for the phase leg 210. For example, depending on the real-time operating status of the electrical system 100, it may be desirable to utilize different PWM techniques, such as continuous PWM or discontinuous PWM, to reduce losses or undesirable harmonics in the electrical system 100. In other operating conditions, it may be desirable to invert the PWM signal to reduce distortion. The microprocessor 202 determines the appropriate modulation mode based on the real-time operating status of the system, and identifies and/or provides the modulation mode to the integrated circuit 204. Additionally, in some operating circumstances, it may be desirable to generate the PWM signals using a different modulation scheme, for example, to reduce ripple current or improve system efficiency. For example, a center-based modulation scheme may be more efficient during steady state conditions (e.g., when the vehicle 102 is traveling on a flat surface or at a constant speed), while an edge-based modulation scheme may be better for transient conditions (e.g., when the vehicle 102 is traveling over a rugged or variable surface). The microprocessor 202 determines the appropriate modulation scheme based on the real-time operating status of the system, and identifies and/or provides the modulation scheme to the integrated circuit 204.

In an exemplary embodiment, the integrated circuit 204 is realized as an application specific integrated circuit (ASIC). As depicted in FIG. 2, the integrated circuit 204 is realized as a component or package that is physically distinct and separate from the microprocessor 202 and the gate driver 206. The integrated circuit 204 is communicatively coupled to the microprocessor 202 and configured to generate modulation signals for the switches 212, 214 in the inverter phase leg 210 based on the phase modulation command and the modulation criterion determined by the microprocessor 202. For example, based on the switching frequency (or duration of the switching cycle), the percentage duty cycle (or high time for switch 212), and the modulation criterion, generate a first PWM signal for the upper switch 212 and a second PWM signal for the second switch 214. Various methods for generating PWM signals are well known in the art, and as such, will not be described in detail herein. In an exemplary embodiment, the integrated circuit 204 is configured to adjust the modulation signals to provide for dead time, that is, the generated PWM signals include a delay such that the switches 212, 214 have an adequate amount of time to change state (e.g., from fully on to fully off) without both switches 212, 214 being on at the same time, which may lead to a potentially damaging cross-conduction short or saturation fault condition. For example, if the microprocessor 202 determines and/or indicates that an edge-based discontinuous PWM signal should be used for the phase leg 210, the integrated circuit 204 will generate edge-based discontinuous PWM signals for the switches 212, 214 having the desired switching frequency and duty cycle, and adjust the PWM signals to incorporate dead time.

In accordance with one embodiment, the integrated circuit 204 is configured to compare the generated modulation signals to the phase modulation command to verify that they accurately reflect the phase modulation command. If the integrated circuit 204 determines that the generated modulation signals are inaccurate, the integrated circuit 204 is configured to substitute predetermined modulation signals for the generated modulation signals and output the predetermined modulation signals. The predetermined modulation signals are preferably designed to mitigate any undesired torque that may otherwise be caused if the generated modulation signals were used to operate the phase leg 210. In accordance with one embodiment, the predetermined modulation signals are chosen such that both switches 212, 214 in the phase leg 210 are turned off. Additionally, if the integrated circuit 204 receives a phase modulation command that is not within limits defined by the switching frequency, for example, if the sum of length of time the switches 212, 214 are on (or the sum of the respective duty cycles) plus dead time is greater than the switching period defined by the switching frequency, the integrated circuit 204 may also substitute the predetermined modulation signals for the generated modulation signals.

In an exemplary embodiment, the gate driver 206 is realized as a power circuit that drives the switches 212, 214 and provides isolation and voltage level translation from the integrated circuit 204, as will be appreciated in the art. As depicted in FIG. 2, the gate driver 206 is implemented as a circuit, package, or arrangement of components that is physically distinct from the microprocessor 202 and the integrated circuit 204. The gate driver 206 is configured to modulate the switches 212, 214 in the inverter phase leg 210 based on the modulation signals generated and/or provided by the integrated circuit 204. The gate driver 206 may also include error detection circuitry that is capable of detecting and/or sensing a cross-conduction condition (e.g., short-circuit) in the phase leg 210, and in response, indicate the condition to the microprocessor 202. The microprocessor 202 is preferably configured to turn off the switches 212, 214 either by a direct connection (not illustrated) to the phase leg 210 or via commands to the integrated circuit 204.

As shown in FIG. 2, in accordance with one embodiment, the microprocessor 202, the integrated circuit 204, and gate driver 206 are all mounted or affixed to a single circuit card assembly 208. The circuit card assembly 208 may be realized as a printed circuit board (PCB), direct bond copper (DBC) substrate, or another suitable electronic substrate. In this regard, the microprocessor 202, the integrated circuit 204, and gate driver 206 may be soldered to the circuit card assembly 208 and communicatively coupled to each other via one or more conductive traces etched into a conductive surface and/or layer of the circuit card assembly 208. In an exemplary embodiment, the circuit card assembly 208 is configured to provide isolation between the gate driver 206 and the integrated circuit 204, by using one or more circuit board isolation techniques, such as isolating power planes, signal routing signals, or another suitable technique known in the art.

Figure 3:
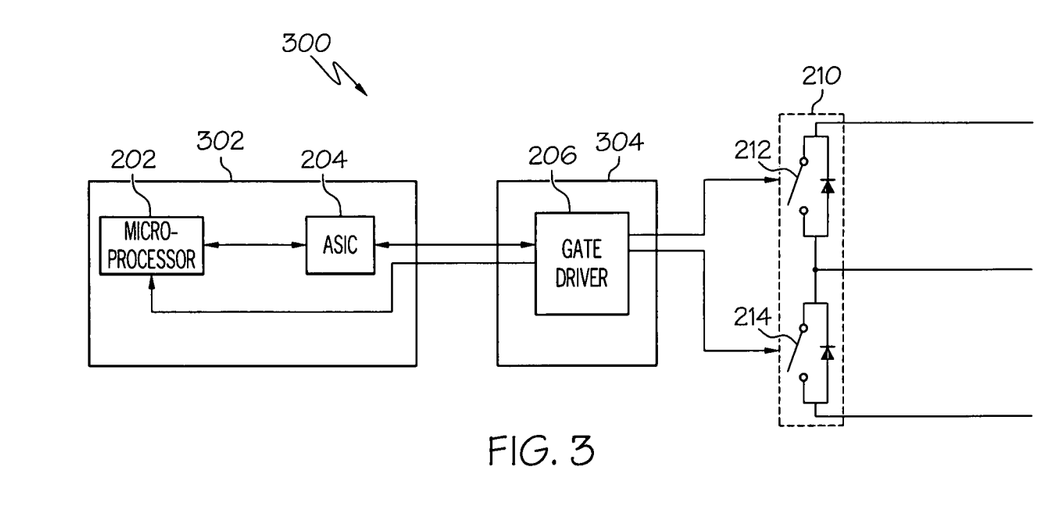
FIG. 3 is a block diagram of a control module suitable for use with the electrical system of FIG. 1 in accordance with another embodiment.

Referring now to FIG. 3, in accordance with one embodiment, a control module 300 may be realized using a first circuit card assembly 302 and a second circuit card assembly 304. In this embodiment, the microprocessor 202 and integrated circuit 204 are mounted and/or affixed to the first circuit card assembly 302 and communicatively coupled, in a similar manner as described above in the context of FIG. 2. The gate driver 206 is mounted and/or affixed to the second circuit card assembly 304. In an exemplary embodiment, the gate driver 206 is communicatively coupled to the microprocessor 202 and integrated circuit 204 by mechanically coupling the two circuit card assemblies 302, 304. For example, the circuit card assemblies 302, 304 may include a mechanical interface, such as a harness or spring-fit mating arrangement that establishes electrical interconnectivity among the circuit card assemblies 302, 304 when mechanically coupled. The remaining elements of the control module 300 are similar to their counterpart elements found in the control module 200 described above with reference to FIG. 2. These common elements will not be redundantly described in detail here in the context of the control module 300. It will be appreciated in the art that the embodiment shown in described in FIG. 3 provides physical isolation for the gate driver 206, which operates at a higher power than the microprocessor 202 and integrated circuit 204, along with improved packaging flexibility by utilizing separate circuit card assemblies 302, 304.

Figure 4:
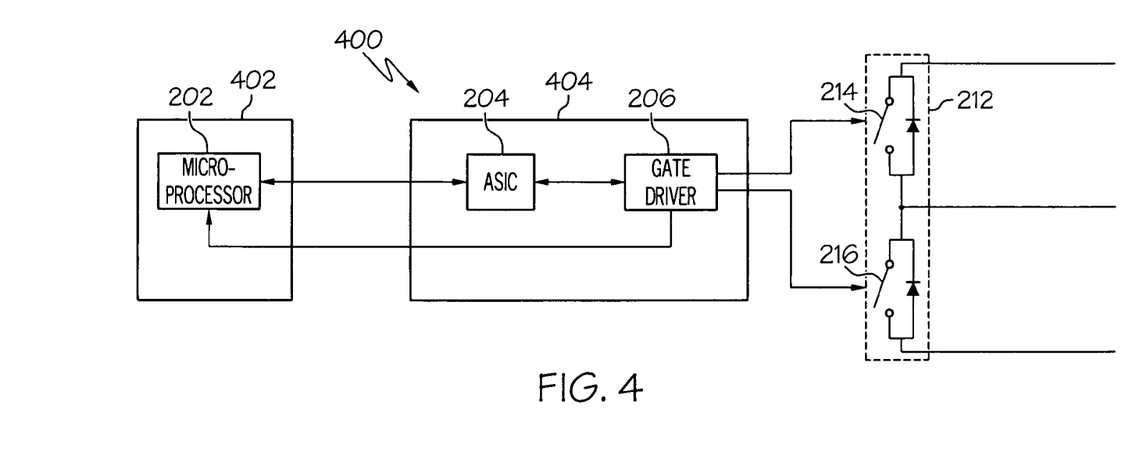
FIG. 4 is a block diagram of a control module suitable for use with the electrical system of FIG. 1 in accordance with yet another embodiment.

Referring now to FIG. 4, in another embodiment, a control module 400 may be realized using a first circuit card assembly 402 having the microprocessor 202 mounted and/or affixed thereon, and a second circuit card assembly 404 having the integrated circuit 204 and gate driver 206 are mounted and/or affixed thereon. The microprocessor 202, integrated circuit 204, and gate driver 206 may be mounted and/or affixed to the respective circuit card assemblies 402, 404 and communicatively coupled, in a similar manner as described above in the context of FIG. 2 and FIG. 3. The elements of the control module 400 are similar to their counterpart elements found in the control modules 200, 300 described above with reference to FIG. 2 and FIG. 3. These common elements will not be redundantly described in detail here in the context of the control module 400. The embodiment shown in FIG. 4 provides the packaging flexibility to increase the physical distance between the microprocessor 202 and the inverter. By subjecting the microprocessor 202 to less harsh operating conditions, the durability requirements and cost for the microprocessor 202 may be reduced.

Figure 5:
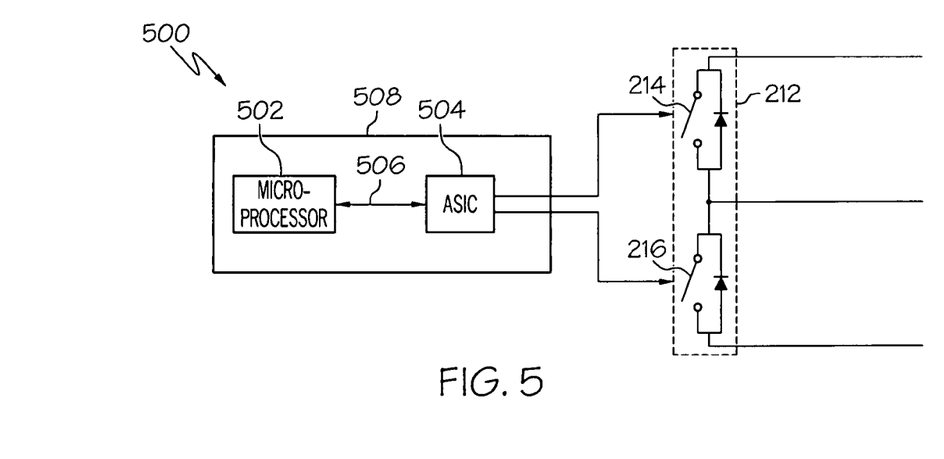
FIG. 5 is a block diagram of a control module suitable for use with the electrical system of FIG. 1 in accordance with a further embodiment.

FIG. 5 illustrates a control module 500 suitable for use as a controller (e.g., control module 110) in the electrical system 100 of FIG. 1 in accordance with one embodiment. The control module 500 includes, without limitation, a microprocessor 502 and an integrated circuit 504. In the embodiment shown in FIG. 5, the microprocessor 502 and the integrated circuit 504 are communicatively coupled and mounted on a circuit card assembly 508. The output of the integrated circuit 504 is coupled to the phase leg 210 of an inverter (e.g., leg 120, 122 or 124 of inverter 106), and configured to operate switches 212, 214 as described in greater detail below.

In an exemplary embodiment, the microprocessor 502 and integrated circuit 504 are communicatively coupled over a parallel bus 506 and communicate digitally. In this regard, the microprocessor 502 may determine the phase modulation command and modulation criterion, as described above in the context of FIG. 2. The microprocessor 502 may then provide the duration of the switching cycle along with the high time for the phase leg 210 to the integrated circuit 504 over the parallel bus 506. The integrated circuit 504 then generates modulation signals for the switches 212, 214 in a similar manner as described above in the context of FIG. 2.

As depicted in FIG. 5, in an exemplary embodiment, the microprocessor 502 is implemented as an integrated circuit chip or package that is physically distinct from the integrated circuit 504. In an exemplary embodiment, the integrated circuit 504 is realized as an application specific integrated circuit (ASIC), which is physically distinct and separate from the microprocessor 502. The integrated circuit 504 generates modulation signals, as described above in regards to the integrated circuit 204 of FIG. 2. The integrated circuit 504 is configured to modulate the switches 212, 214 in the inverter phase leg 210 based on the generated modulation signals. In this regard, the integrated circuit 504 may include power circuitry that provides the voltage level translation to allow the integrated circuit 504 to turn the switches 212, 214 on and off. The integrated circuit 504 may also include error detection circuitry that is capable of detecting and/or sensing a cross-conduction condition (e.g., short-circuit) in the phase leg 210, and in response, indicate the condition to the microprocessor 502.

Figure 6:
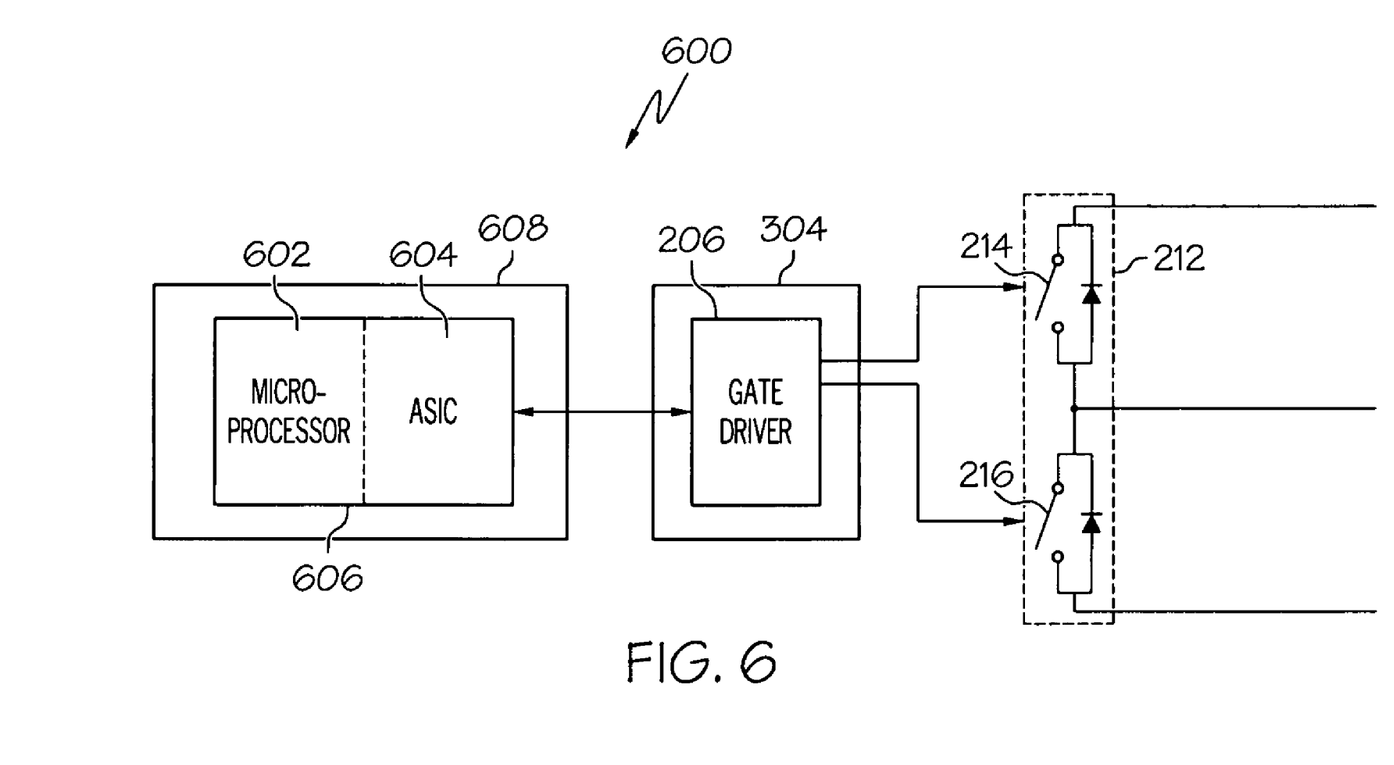
FIG. 6 is a block diagram of a control module suitable for use with the electrical system of FIG. 1 in accordance with another embodiment.

FIG. 6 illustrates a control module 600 suitable for use as a control module in the electrical system 100 of FIG. 1 in accordance with one embodiment. The control module 600 includes, without limitation, a microprocessor 602, an integrated circuit 604, and a gate driver 206. In the embodiment shown in FIG. 6, the microprocessor 602 and the integrated circuit 604 are integral and formed on a common semiconductor substrate 606. The semiconductor substrate 606 is mounted and/or affixed to a first circuit card assembly 608 in a conventional manner. In an exemplary embodiment, the gate driver 206 is communicatively coupled to the microprocessor 602 and integrated circuit 604 by mechanically coupling the two circuit card assemblies 304, 608. For example, the circuit card assemblies 304, 608 may include a mechanical interface for establishing electrical interconnectivity, as described above in the context of FIG. 3. It will be appreciated in the art that the embodiment shown in described in FIG. 6 provides isolation for the gate driver 206, which operates at a higher power than the microprocessor 602 and integrated circuit 604, along with improved packaging flexibility by utilizing separate circuit card assemblies 304, 608.

To briefly summarize, the systems and/or methods described above provide dynamic PWM control of power inverters used to operate electric motors. A microprocessor and integrated circuit are cooperatively configured to enable dynamic PWM moding and dynamic PWM generation based on real-time operation of the electric motor for improved efficiency. Additionally, the switching frequency may be varied to further improve efficiency. The microprocessor may achieve increased throughput and the control software may be simplified by offloading tasks and computations to the integrated circuit. Furthermore, the systems described above eliminate the need for buffers, amplifiers, or other discrete components to interface between system components, and thereby provide improved packaging flexibility.

Other embodiments may utilize system and method described above in different types of automobiles, different vehicles (e.g., watercraft and aircraft), or in different electrical systems altogether, as it may be implemented in any situation where it is desirable to reduce the ripple current caused by a power module. Further, the motor and the inverters may have different numbers of phases, and the systems described herein should not be construed as limited to a three-phase design. The basic principles discussed herein may be extended to higher-order phase systems as will be understood in the art.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A control module for an inverter in a vehicle, the control module comprising:
    a first circuit card assembly;
    a microprocessor mounted on the first circuit card assembly, the microprocessor being configured to:
        determine a phase modulation command for a first motor phase; and
        determine a modulation criterion for the inverter; and
    an integrated circuit mounted on the first circuit card assembly and communicatively coupled to the microprocessor, the integrated circuit being configured to:
        generate a first modulation signal based on the phase modulation command and the modulation criterion; and
        generate a second modulation signal based on the phase modulation command and the modulation criterion, wherein the control module is configured to:
            modulate a first switch in the inverter based on the first modulation signal; and
            modulate a second switch in the inverter based on the second modulation signal, wherein the first switch and the second switch comprise a phase leg of the inverter.

2. The control module of claim 1, wherein the integrated circuit is configured to determine if the first modulation signal and the second modulation signal are accurate based on the phase modulation command.

3. The control module of claim 1, wherein the integrated circuit is configured to generate the first modulation signal and the second modulation signal by adjusting for dead time.

4. The control module of claim 1, wherein:
    the microprocessor is configured to determine the phase modulation command by:
        determining a switching frequency for the first motor phase; and
        determining a percentage duty cycle for the first motor phase; and
    the integrated circuit is configured to:
        generate the first modulation signal based on the switching frequency, the percentage duty cycle, and the modulation criterion; and
        generate the second modulation signal based on the switching frequency, the percentage duty cycle, and the modulation criterion.

5. A control module for an inverter in a vehicle, the control module comprising:
    a first circuit card assembly;
    a microprocessor mounted on the first circuit card assembly, the microprocessor being configured to:
        determine a phase modulation command for a first motor phase; and
        determine a modulation criterion for the inverter;
    an integrated circuit communicatively coupled to the microprocessor, the integrated circuit being configured to:
        generate a first modulation signal based on the phase modulation command and the modulation criterion; and
        generate a second modulation signal based on the phase modulation command and the modulation criterion; and
    a gate driver communicatively coupled to the integrated circuit and the inverter, the gate driver being configured to:
        modulate a first switch in the inverter based on the first modulation signal; and modulate a second switch in the inverter based on the second modulation signal, wherein the first switch and the second switch comprise a phase leg of the inverter.

6. The control module of claim 5, further comprising a second circuit card assembly coupled to the first circuit card assembly, wherein the gate driver is mounted on the second circuit card assembly.

7. The control module of claim 6, wherein the integrated circuit is mounted on the second circuit card assembly.

8. The control module of claim 7, wherein the integrated circuit and the gate driver are each mounted on the first circuit card assembly.

9. An automotive drive system comprising:
an energy source;
an electric motor having a phase;
an inverter coupled between the energy source and the electric motor, the inverter having a phase leg corresponding to the phase of the electric motor, wherein the phase leg comprises a first switch and a second switch;
a control module coupled to the inverter and configured to modulate the phase leg of the inverter to achieve a desired power flow between the energy source and the electric motor, wherein the control module comprises:
a microprocessor configured to:
determine a phase modulation command for the phase of the electric motor; and
determine a modulation criterion for the inverter;
an integrated circuit communicatively coupled to the microprocessor, the integrated circuit being configured to:
generate a first modulation signal for the first switch based on the phase modulation command and the modulation criterion; and
generate a second modulation signal for the second switch based on the phase modulation command and the modulation criterion; and
a gate driver communicatively coupled to the integrated circuit and the phase leg of the inverter, the gate driver being configured to:
modulate the first switch based on the first modulation signal; and
modulate the second switch based on the second modulation signal.

10. The automotive drive system of claim 9, wherein the control module further comprises a first circuit card assembly, and the integrated circuit and the microprocessor are both mounted on the first circuit card assembly.

11. The automotive drive system of claim 10, wherein the microprocessor and the integrated circuit are integral and formed on a common semiconductor substrate.

12. The automotive drive system of claim 10, wherein the control module further comprises a second circuit card assembly coupled to the first circuit card assembly, and the gate driver is mounted on the second circuit card assembly.

13. The automotive drive system of claim 9, wherein the integrated circuit is configured to determine if the first modulation signal and the second modulation signal are accurate based on the phase modulation command.

14. The automotive drive system of claim 9, wherein the integrated circuit is configured to generate the first modulation signal and the second modulation signal by adjusting for dead time.

15. A control module for an inverter having a phase leg, the phase leg including a first switch and a second switch, the control module comprising:

a microprocessor configured to:
determine a length of a switching cycle;
determine a percentage duty cycle for the phase leg; and
determine a modulation criterion for the inverter;
an application specific integrated circuit communicatively coupled to the microprocessor, the application specific integrated circuit being configured to:
generate a first modulation signal for the first switch based on the length of the switching cycle, the percentage duty cycle, and the modulation criterion; and
generate a second modulation signal for the second switch based on the length of the switching cycle, the percentage duty cycle, and the modulation criterion, wherein the first modulation signal and the second modulation signal are adjusted for dead time.

16. The control module of claim 15, wherein the application specific integrated circuit is coupled to the phase leg and is configured to:
modulate the first switch in the inverter based on the first modulation signal; and
modulate the second switch in the inverter based on the second modulation signal.

17. The control module of claim 15, wherein the application specific integrated circuit is configured to determine if the first modulation signal and the second modulation signal are accurate based on the length of the switching cycle and the percentage duty cycle for the phase leg.

18. A control module for an inverter in a vehicle, the control module comprising:
a first circuit card assembly;
a microprocessor mounted on the first circuit card assembly, the microprocessor being configured to:
determine a phase modulation command for a first motor phase; and
determine a modulation criterion for the inverter; and
an integrated circuit mounted on the first circuit card assembly and communicatively coupled to the microprocessor, the integrated circuit being configured to:
generate a first modulation signal based on the phase modulation command and the modulation criterion; and
generate a second modulation signal based on the phase modulation command and the modulation criterion, wherein the microprocessor and the integrated circuit are integral and formed on a common semiconductor substrate.

19. A control module for an inverter in a vehicle, the control module comprising:
a first circuit card assembly;
a microprocessor mounted on the first circuit card assembly, the microprocessor being configured to:
determine a phase modulation command for a first motor phase; and
determine a modulation criterion for the inverter; and
an integrated circuit communicatively coupled to the microprocessor, the integrated circuit being configured to:
generate a first modulation signal based on the phase modulation command and the modulation criterion; and
generate a second modulation signal based on the phase modulation command and the modulation criterion, wherein the integrated circuit is configured to generate the first modulation signal and the second modulation signal by adjusting for dead time.

20. A control module for an inverter in a vehicle, the control module comprising:

a first circuit card assembly;

a microprocessor mounted on the first circuit card assembly, the microprocessor being configured to:

determine a phase modulation command for a first motor phase by determining a switching frequency and a percentage duty cycle for the first motor phase; and determine a modulation criterion for the inverter; and an integrated circuit communicatively coupled to the microprocessor, the integrated circuit being configured to:

generate a first modulation signal based on the switching frequency, the percentage duty cycle, and the modulation criterion; and generate a second modulation signal based on the switching frequency, the percentage duty cycle, and the modulation criterion.

* * * * *